Dec. 28, 1937.  A. READ  2,103,491
MEANS FOR CONTROLLING AUTOMATIC DIESEL ELECTRIC GENERATORS
Filed May 19, 1936

INVENTOR
ARCHIE READ

ATTORNEYS

Patented Dec. 28, 1937

2,103,491

UNITED STATES PATENT OFFICE 2,103,491

MEANS FOR CONTROLLING AUTOMATIC DIESEL ELECTRIC GENERATORS

Archie Read, Newcastle-on-Tyne, England

Application May 19, 1936, Serial No. 80,615
In Great Britain October 1, 1935

2 Claims. (Cl. 290—31)

Many Diesel electric generators, and other generating systems embodying a generator and a battery operating in parallel therewith, as at present used, are controlled by automatic electrical means designed to form a complete unit which will perform all the functions of a generating station without manual attention, these effects have been heretofore obtained by means of automatic switchboards, magnetic governors, differential relays, etc., combined to give the desired result.

The present invention aims to achieve the several objects without the aid of external relays and devices other than a starting switch or relay and such apparatus as is necessary to protect against engine failure. It consists of a plant which comprises in combination, a dynamo, a Diesel or other constant speed engine adapted to be started by the dynamo acting as a motor, a battery adapted to supply a consumption circuit when the engine is idle, and a switch adapted to connect the battery to the dynamo and start the engine upon increase of load necessitating supply of current by both the dynamo and battery operating together. More particularly and essentially it consists of a dynamo in direct coupling with, or otherwise driven by the Diesel engine, and having, or in which are incorporated, three independent field windings, one of said windings being the conventional shunt winding but capable of producing more than normal field strength, the second being in series with the external load and the third being included in the battery charging and motor starting circuit. These several windings are designed to work together to produce desired balancing effects and in such a way that the second winding, or that which is in series with the external load will, under the conjoint action of the first and third or shunt and battery charging windings, maintain the potential on the armature—as distinct from the line voltage—constant notwithstanding load variation. In other words, the second winding acts primarily as a compound winding, which when working with the shunt will enable the dynamo to give a constant potential suitable for direct lighting and the value is so arranged that the potential on the armature does not vary with the load.

The third winding in the battery charging circuit has three functions. First, to act as a balancing winding, producing a field or having its field in opposition to that of the other two or shunt and series windings when the dynamo is generating, and its value being so arranged that it will allow a definite and constant trickle charge to the battery. This trickle charge can be varied at will by changing the value of the shunt winding by a regulator and will remain at the value set irrespective of the load on the external circuit.

The second function of the third winding is to act as a starting series windings for starting Diesel engine and will function automatically when controlled by an automatic switch or relay, or it may be controlled by a hand closure switch or the like.

The third function of said third winding, in conjunction with the battery, is to absorb all fluctuations in voltage due to the cyclic variations of the Diesel engine.

By suitably proportioning the three windings to work in conjunction with the dynamo armature, the potential across the consumption circuit may remain at a steady value, the governing of the engine of course being allowed for in the design.

The third winding must necessarily be designed to give the exact balancing effect required for trickle charge to the battery. The winding being sufficiently robust to act as a starting winding performs the functions of steadying the cyclic irregularity as well as acting as a starting winding, although it is primarily designed as a balancing winding.

Figure 1:
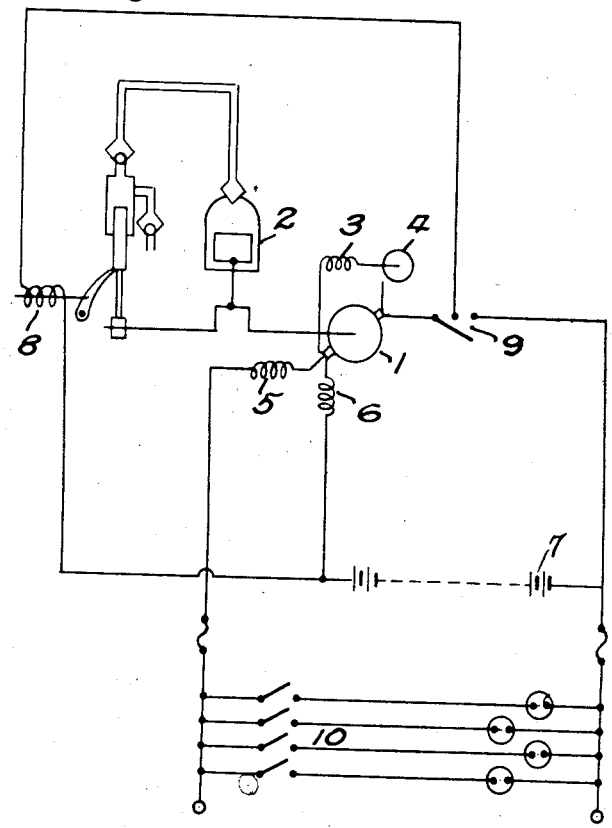
Fig. 1 is a diagram of a simple arrangement in which no switch gear is used except a starting switch.

Referring first to Fig. 1, 1 represents the armature of a Diesel electric generator and 2 represents the engine thereof. Connected therewith is the shunt winding 3, the shunt regulator 4, a field winding 5 referred to as the second winding, another field winding 6 referred to as the third winding, a battery 7, a magnet 8 arranged to establish and cut off fuel supply to the engine, and an engine starting switch 9. A series of consumption circuit switches is indicated at 10.

With the above arrangement, small loads due to closure of any switch 10 may be taken from the leads or terminals fed from the battery 7 through the windings 6 and 5. These windings, being of low resistance, cause but little voltage drop.

Should a greater load be required than it is desirable to take from the battery 7, it is necessary only to close the switch 9 when the Diesel engine or equipment will start up, and cause the armature 1, after it has acted as that of a motor, to ultimately supply up to its full load and at the same time supply a trickle charge to the battery 7 which can be controlled by the regulator 4. Closure of the switch 9 as will be apparent completes the circuit of the solenoid 8.

This simplified form of equipment is suitable for lighting small factories, garages and farms, where only a small demand for current exists except at certain times when full load is required. During the heavy load period the switch 9 is closed and the engine supplies the power.

It will be seen that in the above case there is no provision against such an emergency as engine failure or shortage of fuel. This arrangement therefore is suitable for duty only where an attendant is on the premises during the period when the set system is running.

Figure 2:
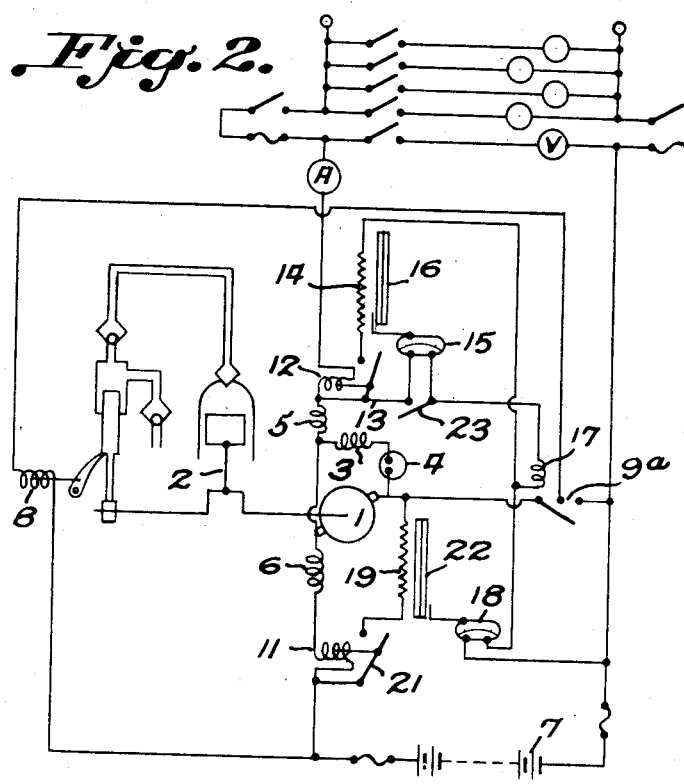
Fig. 2 is a similar diagram of an arrangement in which provision is additionally made for emergency protection such as in a case of engine failure or shortage of fuel.

In Fig. 2, however, there is shown a form or arrangement of the system capable of protecting itself from damage should the engine fail to fire properly or stop through shortage of fuel or any other cause. The system is also adapted to start itself up as and when required as demanded by the load, and is furthermore controlled so that momentary heavy loads, such as those due to small motors being started, will not cause the plant to start up only to stop again immediately.

As in the previous example, external load applied to the terminals will be supplied with current by the battery 7, but in this case it passes first through an emergency coil 11 and then through the two windings 6 and 5 to a load relay A whereof 12 represents the coil and 13 its contacts.

Figure 3:
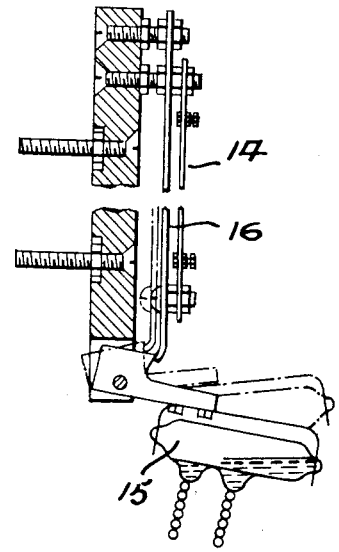
Fig. 3 is a semi-diagrammatic view of a time-lag overload relay for use in the arrangement according to Fig. 2

If the load is a small one, said relay A or 12, 13 will not respond. On the other hand if the load is greater than desirable for the battery, this relay will operate and close the contacts 13 which will allow a current to pass through a thermal resistance 14. The thermal resistance 14 controls a mercury switch 15, which will close say 30 seconds after said load relay A or 12, 13 closes. The resistance 14 is shown in Fig. 3 as associated with a bi-metal strip 16 so that the switch 15 can be tilted from the full line position, when the resistance is cold, to the position shown in dot and dash lines when the resistance and strip 16 are hot. The delaying effect referred to prevents the plant from starting if short but heavy loads are applied such as arise when starting small motors and also prevents repeated stops and starts when the load varies rapidly.

Figure 4:
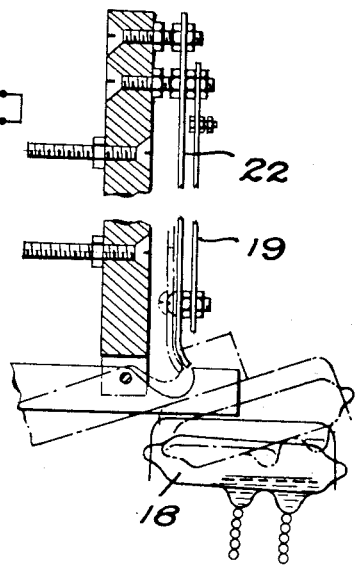
Fig. 4 is a semi-diagrammatic view of another thermal cut-out switch also for use in the arrangement according to Fig. 2.

The closing of the contacts 15 secures operation of the main switch 9ª, which instead of being a hand switch, as in Fig. 1, is a contactor of which 17 is the operating coil. The circuit from the resistance 14, as well as from the contactor operating coil 17, is by way of a mercury cut out switch 18 controlled by a thermal resistance 19 in a circuit 20, which includes contacts 21 of a switch operated by the emergency coil 11. The resistance 19 is shown in Fig. 4 as associated with a bi-metal strip 22 which while cold acts to hold the mercury switch in the full line position indicated, where the contacts 18 are bridged. When the strip 22 is hot, it allows the mercury switch to take up the position indicated in dot and dash lines.

The main contactor 9ª having been closed, current is allowed to pass through the armature 1, winding 6 and coil 11. Current likewise operates the fuel magnet 8.

The plant will now start and run up to speed as previously described.

The function of the emergency coil relay 11, 21, 19, 18 is as follows:—

When the contactor 9ª closes, there is a rush of current through coil 11, causing the contacts 21 to close; these contacts will remain closed until the dynamo generates current causing the current in the coil to fall to nil. The closing of the contacts 21 completes the circuit of the thermal strip heater or resistance 19. This thermal strip heater will allow current to pass for 30 seconds, after which it will open the switch contacts 18. The coil 17 of the main contactor 9ª will in consequence be de-energized. It will therefore be seen that if the engine does not fire in say 30 seconds, the battery 7 will be automatically cut out by opening of the contactor 9ª; also, should the engine run short of fuel or fail, the same will apply, as the battery 7 will again cause the dynamo to act as a motor and in so doing will close the relay 11—21.

A hand starting switch 23 is shown included in the circuit for energizing the coil 17 of the main contactor.

What I claim is:—

1. An electric generator system, comprising a dynamo, a Diesel engine coupled thereto, a battery adapted to supply current to the dynamo so that it will act as a motor, and to be charged by the dynamo when the latter is generating, a consumption circuit adapted to be alternatively supplied with current by the battery and by the dynamo, the said dynamo having an armature provided with three independent field windings, one being the conventional shunt winding but capable of producing more than normal field strength, and the other two being designed to work together to produce balancing effects enabling the dynamo to give a potential on the armature that does not vary with load and allows a definite trickle charge to the battery when the dynamo is generating, a contactor starting switch, a coil for electromagnetic operation of the contactor switch and adapted to be connected across the consumption circuit, a hand set but thermally responsive switch in the circuit of such coil, a normally open heating circuit for said switch, and an emergency coil in series with the aforesaid third winding adapted to close the heating circuit in order to open the circuit of the contactor switch coil.

2. An electric generator system according to claim 1 in which the circuit for the contactor operating coil includes an additional switch which is thermally responsive and normally open but adapted to be closed with closure of a heating circuit switch after a predetermined time interval, said heating circuit switch being operated by a load relay in the consumption circuit.

ARCHIE READ.